(12) United States Patent
Lorberg et al.

(10) Patent No.: US 12,705,613 B2
(45) Date of Patent: Aug. 11, 2026

(54) SYSTEMS AND METHODS FOR PRE-PROCESSING NETWORK MESSAGES TO OPTIMIZE ROUTING

(71) Applicant: MASTERCARD INTERNATIONAL INCORPORATED, Purchase, NY (US)

(72) Inventors: Dana J. Lorberg, Creve Coeur, MO (US); Sandeep Malhotra, Stamford, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 17/479,885

(22) Filed: Sep. 20, 2021

(65) Prior Publication Data

US 2022/0005033 A1 Jan. 6, 2022

Related U.S. Application Data

(63) Continuation of application No. 15/047,415, filed on Feb. 18, 2016, now Pat. No. 11,127,004.

(51) Int. Cl.
*G06Q 20/40* (2012.01)
*G06Q 10/06* (2023.01)
(Continued)

(52) U.S. Cl.
CPC ............. *G06Q 20/40* (2013.01); *G06Q 10/06* (2013.01); *G06Q 20/00* (2013.01); *G06Q 20/382* (2013.01); *G06Q 30/06* (2013.01); *H04L 45/14* (2013.01)

(58) Field of Classification Search
None
See application file for complete search history.

(56) References Cited

U.S. PATENT DOCUMENTS 6,775,280 B1 * 8/2004 Ma ...................... H04L 47/2433 370/392
7,672,267 B2 * 3/2010 Tsai ...................... H04M 15/49 370/338
(Continued)

FOREIGN PATENT DOCUMENTS

CN 101535975 A 9/2009
WO WO-2010106395 A1 * 9/2010 ........... G06Q 20/405
(Continued)

OTHER PUBLICATIONS

Nima Shamsaei, Aref Yadollahi, Linkan Bian, Scott M. Thompson, “An overview of Direct Laser Deposition for additive manufacturing; Part II: Mechanical behavior, process parameter optimization and control”, Additive Manufacturing vol. 8, Oct. 2015, pp. 12-35 (Year: 2015).

(Continued)

*Primary Examiner* — Matthew S Gart
*Assistant Examiner* — Tony P Kanaan
(74) *Attorney, Agent, or Firm* — Armstrong Teasdale LLP

(57) ABSTRACT

A message routing and pre-processing (MRP) computing device is described herein. The MRP computing device is configured to receive an authorization request message associated with a transaction initiated by a cardholder with a merchant, the authorization request message including authorization parameters of the transaction, and retrieve a plurality of potential authorization routes for the authorization request message. Each potential authorization route includes routing parameters and is associated with a respective transaction processing network (TPN). The MRP computing device is also configured to compare the authorization parameters to the routing parameters of each potential authorization route to determine an optimized authorization route for the authorization request message. The optimized authorization route includes routing parameters that most (Continued)

closely match the authorization parameters. The optimized authorization route is associated with a first TPN. The MRP computing device is further configured to route the authorization request message to the first TPN for authorization processing.

17 Claims, 7 Drawing Sheets

(51) Int. Cl.

| | |
|---|---|
| ***G06Q 20/00*** | (2012.01) |
| ***G06Q 20/38*** | (2012.01) |
| ***G06Q 30/06*** | (2023.01) |
| ***H04L 45/00*** | (2022.01) |

(56) References Cited

U.S. PATENT DOCUMENTS 8,655,775 B1 * 2/2014 Howe .................. G06Q 20/027 705/40
8,886,563 B2 * 11/2014 Sakata .............. H04M 15/8044 455/445
10,002,348 B1 * 6/2018 Doctor ................. G06Q 20/401
10,423,937 B2 * 9/2019 Beaudoin ............. G06Q 20/027
11,763,276 B2 * 9/2023 Beaudoin ............. G06Q 20/027 60/725
2002/0019879 A1 * 2/2002 Jasen .................... H04W 28/16 709/240
2002/0071542 A1 * 6/2002 Hedden ............... H04L 45/3065 379/221.02
2003/0118027 A1 * 6/2003 Lee ......................... H04L 45/24 370/395.21
2005/0243726 A1 * 11/2005 Narendran ............ H04L 12/145 370/465
2007/0005774 A1 * 1/2007 Singh ...................... H04L 67/56 709/227
2007/0174176 A1 * 7/2007 Brucato ................. G06Q 40/04 705/37
2008/0120433 A1 * 5/2008 Cieslak ................. H04L 67/563 709/238
2012/0072347 A1 * 3/2012 Conway ................ H04L 45/308 705/44
2012/0130842 A1 * 5/2012 Giordano ............... G06Q 30/08 705/26.3
2012/0254034 A1 * 10/2012 Statland ................. G06Q 40/02 705/44
2012/0271765 A1 * 10/2012 Cervenka ............... G06Q 20/12 705/44
2012/0290348 A1 * 11/2012 Hackett ................ G06Q 10/101 709/226
2013/0097078 A1 * 4/2013 Wong ..................... G06Q 20/10 705/44
2013/0282563 A1 * 10/2013 Masterson ............. G06Q 20/08 705/39
2013/0297790 A1 * 11/2013 Ashihara ................. H04L 45/30 709/224
2014/0040114 A1 * 2/2014 Baumgart ............ G06Q 20/102 705/39
2014/0040148 A1 * 2/2014 Ozvat .................... G06Q 20/40 705/71
2014/0158759 A1 * 6/2014 Smets ................ G06Q 20/3552 235/379
2014/0199963 A1 * 7/2014 Mohebbi ............. H04W 12/069 455/410
2014/0237138 A1 * 8/2014 Xu ........................ H04L 69/329 709/238
2014/0258523 A1 * 9/2014 Kazerani ................. H04L 43/08 709/224
2015/0019567 A1 * 1/2015 Li ......................... G06F 16/335 707/748
2015/0058220 A1 * 2/2015 Cazanas ............. G06Q 20/3263 705/44
2015/0339651 A1 * 11/2015 Hampapur ............. G06Q 40/02 705/39
2017/0017935 A1 * 1/2017 Beaudoin ............. G06Q 20/027
2017/0243207 A1 * 8/2017 Lorberg ................. G06Q 20/40
2017/0364915 A1 * 12/2017 Levy ...................... G06Q 20/22
2018/0183688 A1 * 6/2018 Mihály ............... H04L 41/5051
2018/0314991 A1 * 11/2018 Grundberg ......... G06Q 30/0639
2018/0316600 A1 * 11/2018 Renard ................... H04L 45/42

FOREIGN PATENT DOCUMENTS

WO 2015009427 A1 1/2015
WO WO-2015177305 A1 * 11/2015 ............. G06Q 40/02

OTHER PUBLICATIONS

PCT International Search Report and Written Opinion, Application No. PCT/US2017/017780, dated Apr. 4, 2017, 13 pages.
European Office Action for Application No. 17706134.8, dated Jul. 3, 2019, 6 pages.
Indian First Examination Report, Application No. 201817031483, dated Dec. 10, 2020, 9 pages.
Search Report for corresponding Chinese Patent Application No. 201780011912.0, mailed May 21, 2021, 18 pages.: with English Translation.

* cited by examiner

22
ACCOUNT-HOLDER
20
TRANSACTION BEGINS

24
MERCHANT
AUTHENTICATION
26
MERCHANT BANK
28
NETWORK
MERCHANT PAYMENT
TRANSACTION SUBMITTED
102
30
ISSUER
MRP COMPUTING DEVICE
MERCHANT PAYMENT
32
ACCOUNT-HOLDER ACCOUNT
ACCOUNT-HOLDER PAYMENT 100
110
DATABASE
108
DATABASE SERVER
MESSAGE ROUTING AND PRE-PROCESSING COMPUTING DEVICE
102
104
USER COMPUTING DEVICE
115
115
115
28
TRANSACTION PROCESSING NETWORK

FIG. 4

TO/FROM
REMOTE
DEVICE

401

415

COMM.
INTERFACE

405

PROCESSOR

410

MEMORY

420

STORAGE
INTERFACE

425

STORAGE
DEVICE

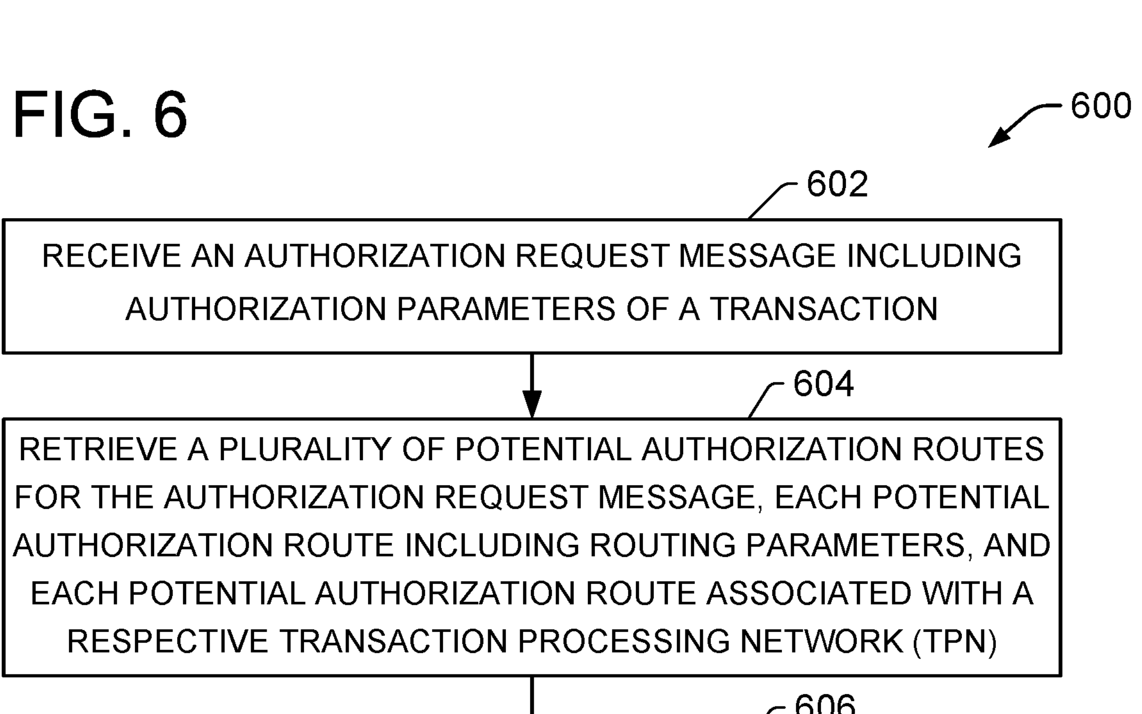
FIG. 6
600
602
RECEIVE AN AUTHORIZATION REQUEST MESSAGE INCLUDING AUTHORIZATION PARAMETERS OF A TRANSACTION
604
RETRIEVE A PLURALITY OF POTENTIAL AUTHORIZATION ROUTES FOR THE AUTHORIZATION REQUEST MESSAGE, EACH POTENTIAL AUTHORIZATION ROUTE INCLUDING ROUTING PARAMETERS, AND EACH POTENTIAL AUTHORIZATION ROUTE ASSOCIATED WITH A RESPECTIVE TRANSACTION PROCESSING NETWORK (TPN)
606
COMPARE THE AUTHORIZATION PARAMETERS TO THE ROUTING PARAMETERS OF EACH POTENTIAL AUTHORIZATION ROUTE TO DETERMINE AN OPTIMIZED AUTHORIZATION ROUTE FOR THE AUTHORIZATION REQUEST MESSAGE FROM THE PLURALITY OF POTENTIAL AUTHORIZATION ROUTES, WHEREIN THE OPTIMIZED AUTHORIZATION ROUTE INCLUDES THE ROUTING PARAMETERS THAT MOST CLOSELY MATCH THE AUTHORIZATION PARAMETERS, THE OPTIMIZED AUTHORIZATION ROUTE ASSOCIATED WITH A FIRST TPN OF THE PLURALITY OF TPNS
608
ROUTE THE AUTHORIZATION REQUEST MESSAGE TO THE FIRST TPN FOR AUTHORIZATION PROCESSING

SYSTEMS AND METHODS FOR PRE-PROCESSING NETWORK MESSAGES TO OPTIMIZE ROUTING

CROSS REFERENCE TO RELATED APPLICATIONS

This application is a continuation of, and claims priority to, U.S. patent application Ser. No. 15/047,415, entitled SYSTEMS AND METHODS FOR PRE-PROCESSING NETWORK MESSAGES TO OPTIMIZE ROUTING, filed Feb. 18, 2016, the entire contents of which are hereby incorporated by reference in their entirety.

BACKGROUND

The field of the disclosure relates generally to routing computer messages through a network, and, more specifically, to network-based methods and systems for pre-processing messages for sending over a computer network to optimize the routing of said messages.

Many types of computer messages are communicated over computer networks. Oftentimes those messages can be sent over different networks. These messages are routed to the network for further transmission thereof. However, some networks may have different capacities, operating parameters, and/or costs associated with their use. For example, in a payment transaction initiated by a cardholder using a payment card at a merchant location, the merchant requests authorization from a merchant bank, or "acquirer" for the amount of the purchase in an "authorization request." Using a transaction processing network (TPN), computers of the acquirer will communicate the authorization request to computers of an issuer of the payment card, to determine whether the cardholder's account is in good standing and whether the purchase is covered by the cardholder's available credit line (or whether the account has sufficient funds therein). Different TPNs operate according to different transaction routing rules, standards, and parameters, including varying processing times and interchange rates. It would be beneficial for a merchant, acquirer, and/or cardholder to have transactions routed to different TPNs according to the preferences thereof, such as processing or routing cost and/or speed.

BRIEF DESCRIPTION

In one aspect, a message routing and pre-processing (MRP) computing device is provided. The MRP computing device includes a processor in communication with a memory. The processor is programmed to receive an authorization request message associated with a transaction initiated by a cardholder with a merchant. The authorization request message includes authorization parameters of the transaction. The processor is also programmed to retrieve a plurality of potential authorization routes for the authorization request message. Each potential authorization route includes routing parameters, and each potential authorization route is associated with a respective transaction processing network (TPN). The processor is further programmed to compare the authorization parameters to the routing parameters to determine an optimized authorization route for the authorization request message from the plurality of potential authorization routes. The optimized authorization route includes the routing parameters that most closely match the authorization parameters, and the optimized authorization route is associated with a first TPN of the plurality of TPNs. The processor is still further programmed to route the authorization request message to the first TPN for authorization processing.

In another aspect, a computer-implemented method for optimized message routing using a message routing and pre-processing (MRP) computing device is provided. The MRP computing device includes a processor in communication with a memory. The method includes receiving an authorization request message associated with a transaction initiated by a cardholder with a merchant. The authorization request message includes authorization parameters of the transaction. The method also includes retrieving a plurality of potential authorization routes for the authorization request message. Each potential authorization route includes routing parameters, and each potential authorization route is associated with a respective transaction processing network (TPN). The method further includes comparing the authorization parameters to the routing parameters of each potential authorization route to determine an optimized authorization route for the authorization request message from the plurality of potential authorization routes. The optimized authorization route includes the routing parameters that most closely match the authorization parameters. In addition, the optimized authorization route is associated with a first TPN of the plurality of TPNs. The method still further includes routing the authorization request message to the first TPN for authorization processing.

In a further aspect, at least one non-transitory computer-readable storage medium having computer-executable instructions embodiment thereon is provided. When executed by a message routing and pre-processing (MRP) computing device including at least one processor in communication with a memory, the computer-executable instructions cause the at least one processor to receive an authorization request message associated with a transaction initiated by a cardholder with a merchant. The authorization request message includes authorization parameters of the transaction. The computer-executable instructions also cause the processor to retrieve a plurality of potential authorization routes for the authorization request message. Rach potential authorization route includes routing parameters, and each potential authorization route is associated with a respective transaction processing network (TPN). The computer-executable instructions further cause the processor to compare the authorization parameters to the routing parameters of each potential authorization route to determine an optimized authorization route for the authorization request message from the plurality of potential authorization routes. The optimized authorization route includes the routing parameters that most closely match the authorization parameters, and the optimized authorization route is associated with a first TPN of the plurality of TPNs. The computer-executable instructions still further cause the processor to route the authorization request message to the first TPN for authorization processing.

BRIEF DESCRIPTION OF THE DRAWINGS

FIGS. 1-7 show example embodiments of the methods and systems described herein.

FIG. 1 is a schematic diagram illustrating an example message routing and pre-processing (MRP) system including an MRP computing device in accordance with one embodiment of the present disclosure.

FIG. 2 is an expanded block diagram of an example embodiment of a system for optimizing routing of network messages, including the MRP computing device shown in FIG. 1.

FIG. 3 illustrates an example configuration of a client computing device used in the system shown in FIG. 2.

FIG. 4 illustrates an example configuration of a server system used in the system shown in FIG. 2.

FIG. 5 illustrates a simplified data flow diagram for optimizing routing of network messages such as transactions by the system shown in FIG. 2.

FIG. 6 is a simplified diagram of an example method for optimizing message routing using the system shown in FIG. 2.

FIG. 7 is a diagram of components of one or more example computing devices that may be used in the system shown in FIG. 2.

Figure 1:
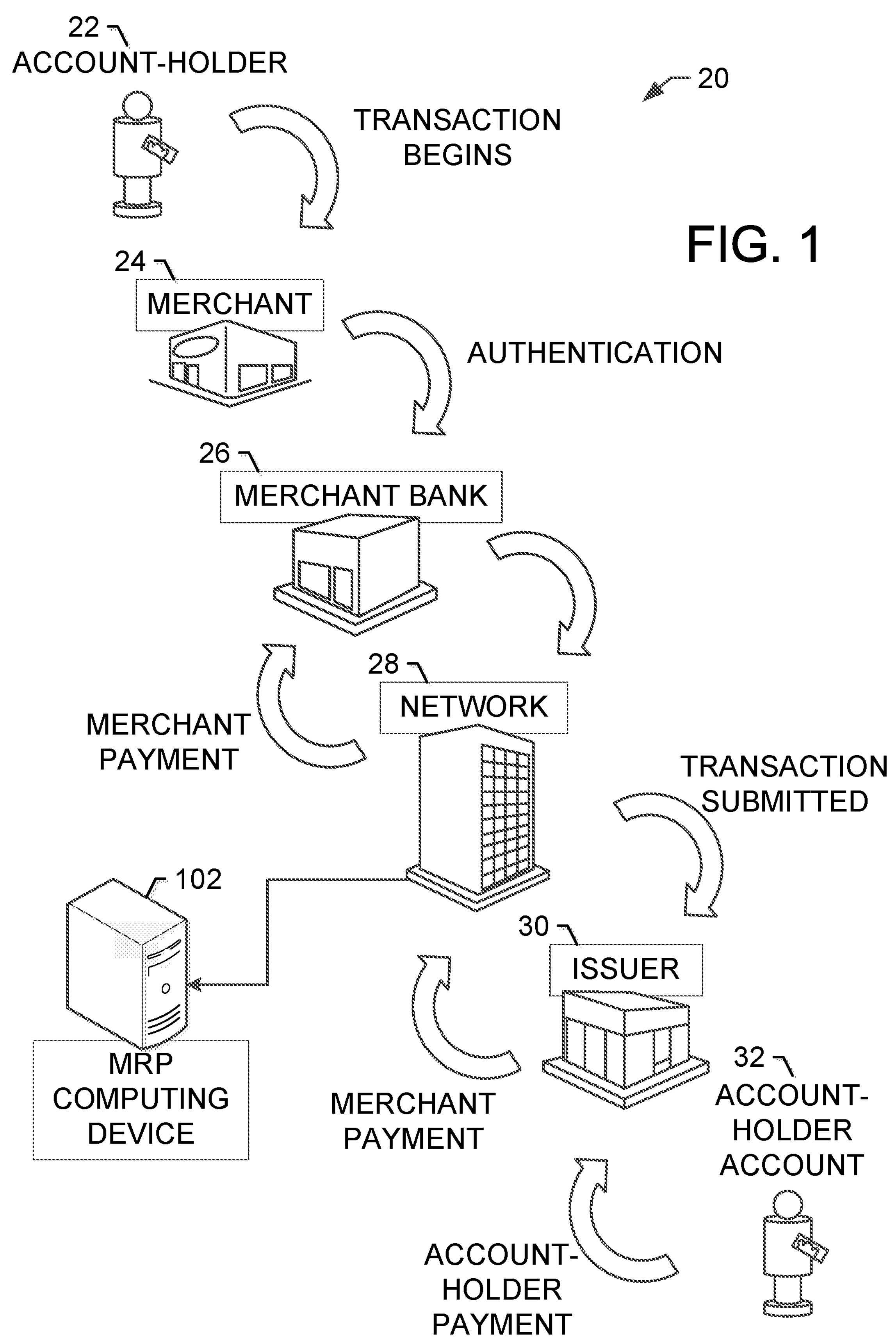

Although specific features of various embodiments may be shown in some drawings and not in others, this is for convenience only. Any feature of any drawing may be referenced and/or claimed in combination with any feature of any other drawing.

DETAILED DESCRIPTION

The system described herein is configured to pre-process computer network messages for optimal routing over one of many different computer networks. In one example embodiment, the system is configured to pre-process financial transactions (e.g., during an authorization process) in order to determine an optimized transaction processing route therefor and route the transaction to a transaction processing network (TPN) associated with the optimized route. In particular, the system is associated with or integral to one or more transaction processors configured to process financial transactions initiated by cardholders using payment cards (e.g., credit cards, debit card, prepaid cards, etc.) at a merchant location. The payment cards are issued by an issuing bank or "issuer." As described above, the merchant requests authorization from a merchant bank, or "acquirer" for the amount of the purchase in an "authorization request message" The authorization request message may be formatted as an International Organization for Standardization (ISO) 8583 network message. Using a TPN, computers of the acquirer will communicate the authorization request message to computers of the issuer to determine whether the cardholder's account is in good standing and whether the purchase is covered by the cardholder's available credit line (or whether the account has sufficient funds therein). Also described above, different TPNs operate using different routing parameters. Routing parameters, as used herein, refer generally to characteristics of a particular TPN's messaging routing processes. For example, TPNs may route authorization request messages according to varying routing parameters such as particular standards, rules, and/or interchange rates. Routing parameters may additionally or alternatively relate to what kind of card is used to initiate the transaction, a security of the transaction, and/or what party (the merchant, the acquirer, or the issuer) is responsible for dispute resolution and/or liability concerns.

Merchants, acquirers, and/or cardholders may also have varying preferences for transaction routing through the different TPNs. These preferences are generally referred to herein as "authorization parameters." For example, any of these parties may have authorization parameters for transaction routing associated with cost, processing speed, security, and/or payment card type. In particular, at least some merchants may set authorization parameters according to their preferences to route authorization requests using the TPN having the routing parameter(s) associated with the lowest interchange rate, fastest speed, highest security or specific payment card type or combinations thereof.

The system described herein includes a message routing and pre-processing (MRP) computing device in communication with a plurality of transaction processors associated with a corresponding plurality of TPNs. Moreover, the MRP computing device is in communication with a plurality of user computing devices (which may include acquirer and/or merchant computing devices) configured to transmit authorization request messages and receive authorization response messages. The MRP computing device may, additionally or alternatively, be in communication with a plurality of merchant computing devices and/or a plurality of issuer computing devices (e.g., any computing device that is party to the processing of a transaction). The MRP computing device includes a processor in communication with a memory. In the example embodiment, the MRP computing device is configured to implement a web-based Application Programming Interface (API) to communicate with the transaction processors and/or acquirer computing devices, such that the MRP computing device is substantially globally accessible. In the example embodiment, when a cardholder initiates a transaction at a merchant using a payment card, the MRP computing device is configured to receive a corresponding authorization request message from an acquirer computing device associated with the merchant. The authorization request message includes authorization parameters of the financial transaction. The authorization parameters may be selected by an acquirer associated with the acquirer computing device, the merchant, and/or the cardholder. For example, the merchant and/or the acquirer may select an authorization parameter that indicates a preference for authorization routing (through a TPN) according to a lowest possible routing cost (e.g., the lowest merchant discount rate (MDR)).

The MRP computing device subsequently retrieves a plurality of routing parameters. The routing parameters are associated with a plurality of potential authorization routes for the authorization request message, each potential authorization route associated with a respective TPN. In other words, the MRP computing device is configured to retrieve all of the routing parameters for any available TPN to route the authorization request message, including interchange cost, security, and/or speed thereof, and/or a particular value-added service associated therewith, for example. The MRP computing device compares the authorization parameters to the routing parameters in order to select an optimized authorization route for the authorization request message. As used herein, the "optimized" authorization route refers to the authorization route associated with the TPN having routing parameters that most closely match or best satisfy the authorization parameters. For example, if the authorization parameters indicate a merchant preference for the lowest-cost routing, the MRP computing device selects the authorization route corresponding to the lowest interchange rate. The selected, optimized authorization route is associated with a particular TPN, and, in one embodiment, the MRP computing device is configured to route the authorization request message to that particular TPN for authorization processing. In other embodiments, the MRP computing device may transmit a notification signal to the acquirer computing device including the optimized authorization route, and the acquirer computing device will transmit the authorization request message to the corresponding TPN.

In still other embodiments, the MRP computing device is associated with a particular, "gateway" TPN. In such embodiments, the MRP computing device selects the optimized transaction processing route, as described above, however, the MRP computing device transmits every authorization request message to the gateway TPN, along with routing instructions. The gateway TPN then processes the routing instructions and transmits the authorization request message to the TPN associated with the optimized transaction processing route. Accordingly, the gateway TPN acts as a "gateway" for all messages pre-processed by the MRP computing device.

In the example embodiment, the MRP computing device is further configured to generate and store a record ("optimized route record") of all optimized routing (whether performed directly by the MRP computing device or transmitted to the acquirer computing device in a notification signal). Such a record may include the authorization request message itself or an identifier thereof, as well as an identifier of the selected, optimized authorization route. In some cases, the optimized route record may further include authorization and/or routing parameters, and/or the comparison thereof, in order to identify why a particular optimized authorization route was selected by the MRP computing device. The MRP computing device may retrieve and/or transmit the optimized route record(s) to corresponding acquirer computing device(s) during a clearing process for transactions having authorizations routed using the MRP computing device. In some embodiments, the MRP computing device may transmit the optimized route record to the gateway TPN associated therewith for use in the clearing process.

Although the MRP computing device has been described as performing pre-processing and routing of authorization messages, it should be understood that the functionality of the MRP computing device is readily applicable to pre-processing prior to receiving an authorization request message (As well as to the pre-processing of any other kind of network messages). The MRP computing device may receive the authorization parameters (e.g., the acquirer-, merchant-, and/or cardholder-set routing preferences) in a message other than an authorization request message, wherein the message is received by the MRP computing device prior to or instead of the receipt of the authorization request message. For example, the MRP computing device may be associated with a pre-processing service offered to merchants, and the MRP computing device may receive a pre-processing message associated with a transaction including the authorization parameters from a merchant computing device. The MRP computing may select the optimized authorization route for the corresponding transaction using the authorization parameters in the same manner as described above. The MRP computing device may then transmit routing instructions to the merchant computing device and/or to an associated acquirer computing device, the routing instructions identifying the TPN associated with the optimized authorization route. The merchant or acquirer computing device may independently process the routing instructions and transmit an associated authorization message to according to the routing instructions.

The systems and methods described herein are configured to solve problems arising in the computer network area. More specifically, the systems and method described herein are configured to solve problems arising in the transaction processing industry, such as limited access to certain TPNs by merchants and acquirers, and stagnant merchant-TPN or acquirer-TPN relationships, in which the acquirer or merchant is "stuck" using one particular TPN even when alternative TPNs may provide improved transaction processing. Through the optimized routing of financial transactions according to user-set preferences, the systems and methods described herein are configured to facilitate (a) improved transaction processing speeds, (b) decreased transaction processing costs, (c) more securely processed transactions, and/or (d) access to alternative TPNs through TPN gateways.

The technical effects of the systems and methods described herein can be achieved by performing at least one of the following steps: (i) receiving an authorization request message associated with a transaction initiated by a cardholder with a merchant, the authorization request message including authorization parameters of the transaction; (ii) retrieving a plurality of routing parameters associated with a plurality of potential authorization routes for the authorization request message, each potential authorization route associated with a respective transaction processing network (TPN); (iii) comparing the authorization parameters to the routing parameters; (iv) selecting, based on the comparing, an optimized authorization route for the authorization request message from the plurality of potential authorization routes, the optimized authorization route associated with a first TPN of the plurality of TPNs; and (v) routing the authorization request message to the first TPN for authorization processing.

The following detailed description of the embodiments of the disclosure refers to the accompanying drawings. The same reference numbers in different drawings may identify the same or similar elements. Also, the following detailed description does not limit the claims.

Described herein are computer systems such as message routing and pre-processing computing devices. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "payment device," "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Moreover, these terms may refer to payments made directly from or using bank accounts, stored valued accounts, mobile wallets, etc., and accordingly are not limited to physical devices but rather refer generally to payment credentials. Each type of payment device can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to the routing of messages to an optimized computer network.

FIG. 1 is a schematic diagram illustrating an example message routing and pre-processing (MRP) system 20. MRP system 20 includes an MRP computing device 102 for optimizing message routing (such as transaction message routing). MRP computing device 102 is in communication with at least one transaction processing network (TPN) 28. In a typical transaction card system, a financial institution called the "issuer" issues a transaction card, such as a credit card, to a consumer or account-holder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When account-holder 22 tenders payment for a purchase with a transaction card, merchant 24 requests authorization from a merchant bank 26 for the amount of the purchase. The request is usually performed through the use of a point-of-sale terminal, which reads account-holder's 22 account information from a magnetic stripe, a chip, or embossed characters on the transaction card and communicates electronically with the transaction processing computers of merchant bank 26.

Using an interchange network 28 (also referred to herein as a (TPN)), computers of merchant bank 26 will communicate with computers of an issuer bank 30 to determine whether account-holder's 22 account 32 is in good standing and whether the purchase is covered by account-holder's 22 available credit line. Based on these determinations, the request for authorization will be declined or accepted. When a request for authorization is accepted, the available credit line of account-holder's 22 account 32 is decreased. Normally, a charge for a payment card transaction is not posted immediately to account-holder's 22 account 32 because bankcard associations, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. TPN 28 and/or issuer bank 30 stores the transaction card information, such as a type of merchant, amount of purchase, date of purchase, in a database 110 (shown in FIG. 2).

After a purchase has been made, a clearing process occurs to transfer additional transaction data related to the purchase among the parties to the transaction, such as merchant bank 26, TPN 28, and issuer bank 30. More specifically, during and/or after the clearing process, additional data, such as a time of purchase, a merchant name, a type of merchant, purchase information, account-holder account information, a type of transaction, savings information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between TPN 28 and merchant bank 26, and then between merchant bank 26 and merchant 24.

In the example embodiment, a plurality of TPNs 28 are in communication with MRP computing device 102. It should be understood that there may be a plurality of MRP computing devices 102, each of which may be in communication with a plurality of TPNs 28. MRP computing device 102 is configured to receive routing parameters from each TPN 28, wherein the routing parameters are descriptive of the routing and processing characteristics of the corresponding TPN 28 (e.g., processing speed, interchange rate, processing standards or rules, etc.). MRP computing device 102 is further configured to, in some embodiments, transmit or route authorization request messages to various TPNs 28 whose routing parameters are optimal for processing corresponding authorization requests. In another embodiment, MRP computing device 102 only routes authorization request messages to a single, "gateway" TPN (not shown in FIG. 1), along with routing instructions to route or transmit the authorization request message to a different TPN 28 associated with an optimized authorization route. The gateway TPN then processes the routing instructions and itself transmits the authorization request message to the TPN 28 identified in the routing instructions.

Figure 2:
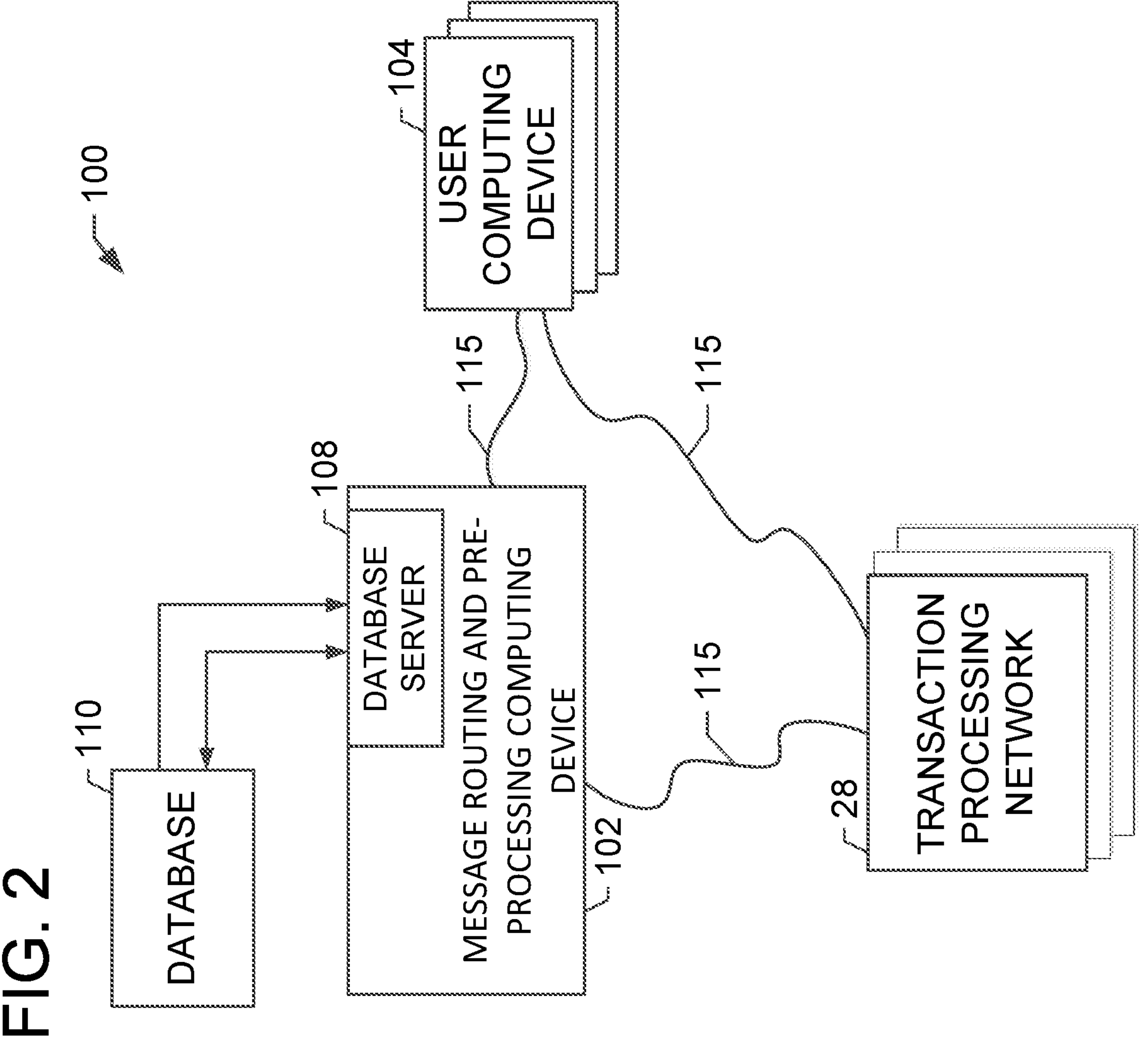

FIG. 2 is an expanded block diagram of an example embodiment of a system 100 for optimizing routing of network messages, such as network messages associated with financial transactions. More specifically, in the example embodiment, system 100 includes a message routing and pre-processing (MRP) computing device 102, and a plurality of client sub-systems, also referred to as user computing devices 104, in communication with MRP computing device 102. User computing devices 104 may include, for example, acquirer computing devices, merchant computing devices (e.g., merchant point-of-sale (POS) devices), and/or cardholder computing devices. In one embodiment, user computing devices 104 are computers including a communication interface (e.g., including a web browser or other web-access capability), such that MRP computing device 102 is accessible to user computing devices 104 using the Internet and/or using network 115. User computing devices 104 are interconnected to the Internet through many interfaces including a network 115, such as a local area network (LAN) or a wide area network (WAN), dial-in-connections, cable modems, special high-speed Integrated Services Digital Network (ISDN) lines, and RDT networks. User computer devices 104 could be any device capable of interconnecting to the Internet, including a web-based phone, personal computer, server computing device, or other web-based connectable equipment. MRP computing device 102 is also in communication with a plurality of transaction processing networks (TPNs) 28 using network 115.

A database server 108 is connected to database 110, which contains information on a variety of matters, as described below in greater detail. In one embodiment, centralized database 110 is stored on MRP computing device 102. In an alternative embodiment, database 110 is stored remotely from MRP computing device 102 and may be non-centralized. Database 110 may include a single database having separated sections or partitions, or may include multiple databases, each being separate from each other. Database 110 may be a database configured to store information used by MRP computing device 102 including, for example, routing parameters associated with corresponding TPNs 28, authorization parameters associated with corresponding user computing devices 104, authorization request messages, potential authorization or processing routes, optimized route records, and any other information as described herein.

Figure 3:
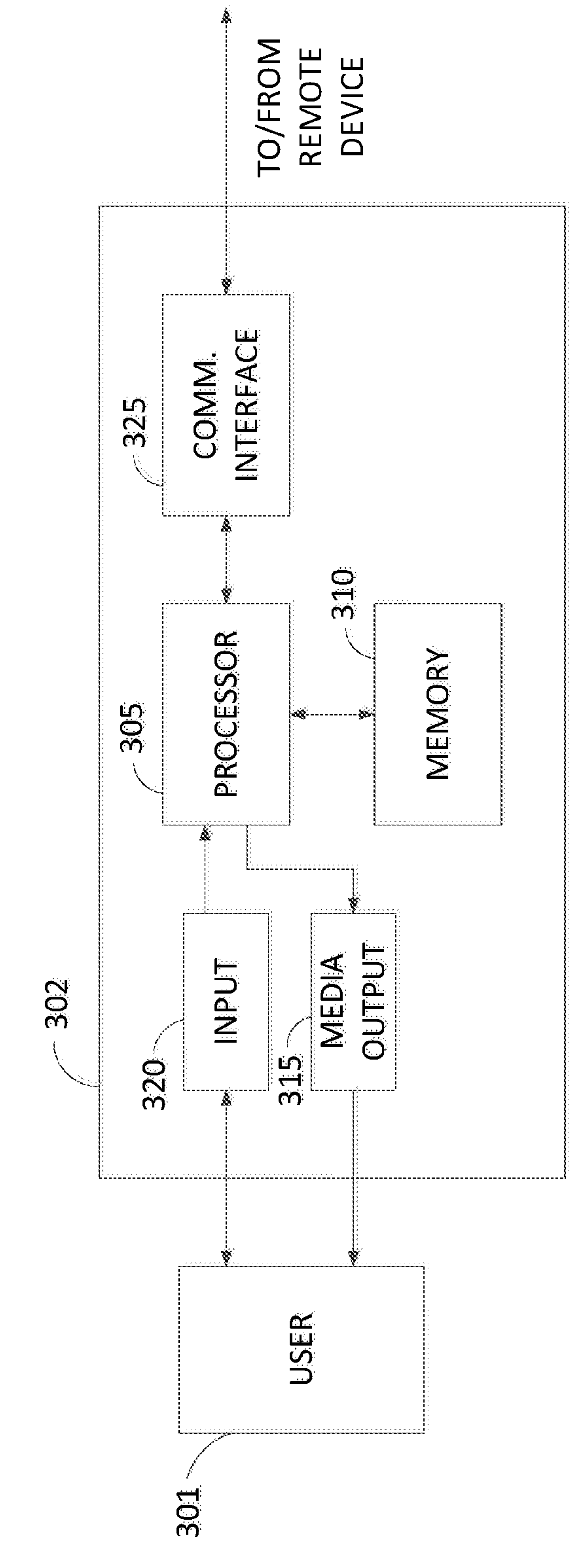

FIG. 3 illustrates an example configuration of a client computing device 302. Client computing device 302 may include, but is not limited to, client systems ("user computing devices") 104 (shown in FIG. 2). Client computing device 302 includes a processor 305 for executing instructions. In some embodiments, executable instructions are stored in a memory area 310. Processor 305 may include one or more processing units (e.g., in a multi-core configuration) . Memory area 310 is any device allowing information such as executable instructions and/or other data to be stored and retrieved. Memory area 310 may include one or more computer-readable media.

Client computing device 302 also includes at least one media output component 315 for presenting information to a user 301 (e.g., a cardholder or user associated with a merchant). Media output component 315 is any component capable of conveying information to user 301. In some embodiments, media output component 315 includes an output adapter such as a video adapter and/or an audio adapter. An output adapter is operatively coupled to processor 305 and operatively couplable to media output component 315 such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 302 includes an input device 320 for receiving input from user 301. Input device 320 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 315 and input device 320. Stored in memory area 310 are, for example, computer-readable instructions for providing a user interface to user 301 via media output component 315 and, optionally, receiving and processing input from input device 320 (e.g., authorization parameters and/or other routing or processing preferences).

Client computing device 301 may also include a communication interface 325, which is communicatively couplable to a remote device such as message routing and pre-processing (MRP) computing device 102 (shown in FIG. 1) and/or another user computing device 104 (e.g., via a web-based application programming interface (API)). Communication interface 325 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Figure 4:
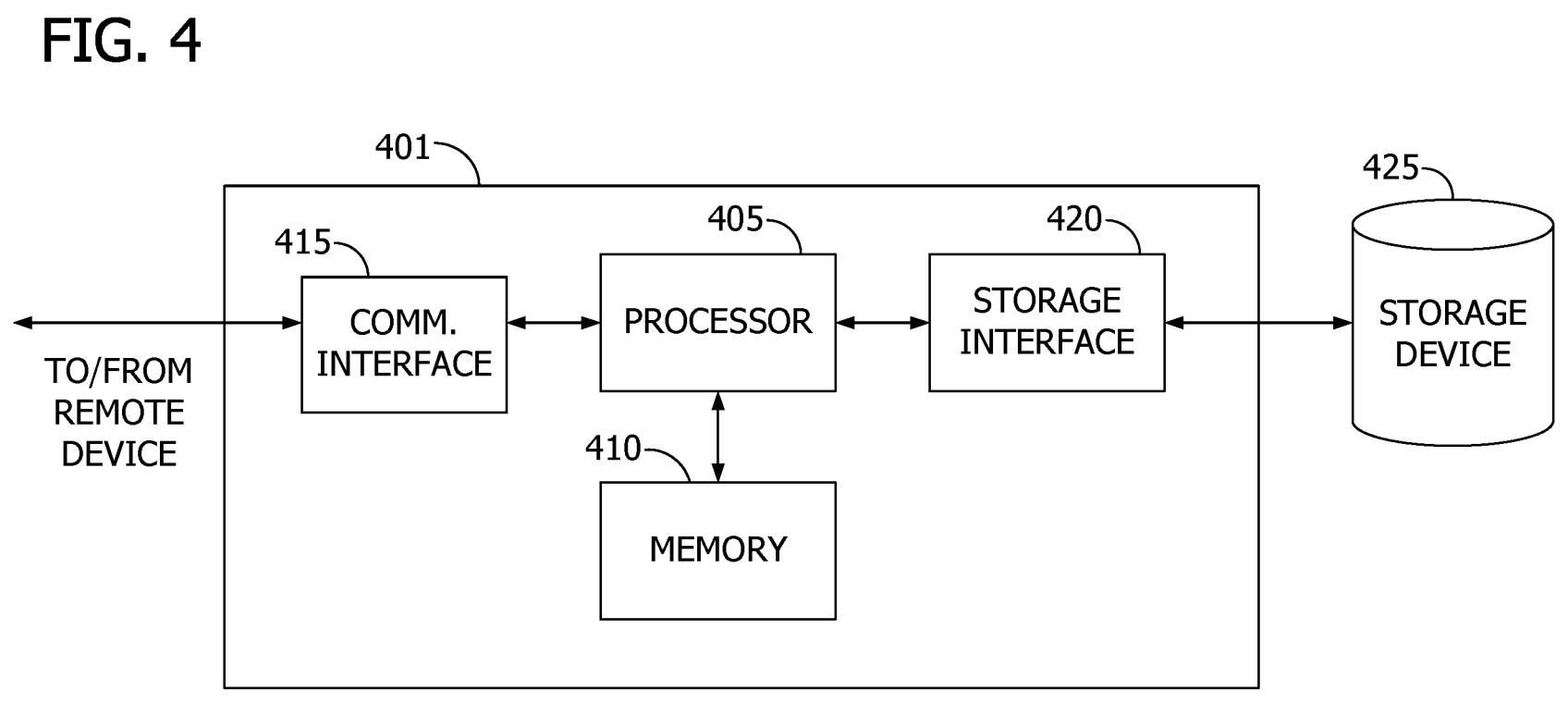

FIG. 4 illustrates an example configuration of a server system 401 such as message routing and pre-processing (MRP) computing device 102 and/or a user computing device 104 (both shown in FIG. 1) used to optimize transaction routing and processing, in accordance with one example embodiment of the present disclosure. Server system 401 may also include, but is not limited to, database server 108 (also shown in FIG. 1).

Server system 401 includes a processor 405 for executing instructions. Instructions may be stored in a memory area 410, for example. Processor 405 may include one or more processing units (e.g., in a multi-core configuration) for executing instructions. The instructions may be executed within a variety of different operating systems on the server system 401, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 405 is operatively coupled to a communication interface 415 such that server system 401 is capable of communicating with a remote device such as a user system or another server system 401. Communication interface 415 may include, for example, a transceiver, a transmitter, a receiver, an Ethernet communication interface, an RS-485/EIA-485 communications interface, a GPIB communications interface, a Programmable Logic Controller (PLC), an RS-322 communication interface, and/or any other communication interface device and/or component. For example, communication interface 415 may receive requests (e.g., requests to provide an interactive user interface) from a client system 104 via the Internet, as illustrated in FIG. 2.

Processor 405 may also be operatively coupled to a storage device 425. Storage device 425 is any computer-operated hardware suitable for storing and/or retrieving data. In some embodiments, storage device 425 is integrated in server system 401. For example, server system 401 may include one or more hard disk drives as storage device 425. In other embodiments, storage device 425 is external to server system 401 and may be accessed by a plurality of server systems 401. For example, storage device 425 may include multiple storage units such as hard disks or solid state disks in a redundant array of inexpensive disks (RAID) configuration. Storage device 425 may include a storage area network (SAN) and/or a network attached storage (NAS) system.

In some embodiments, processor 405 is operatively coupled to storage device 425 via a storage interface 420. Storage interface 420 is any component capable of providing processor 405 with access to storage device 425. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 425.

Memory area 410 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 5:
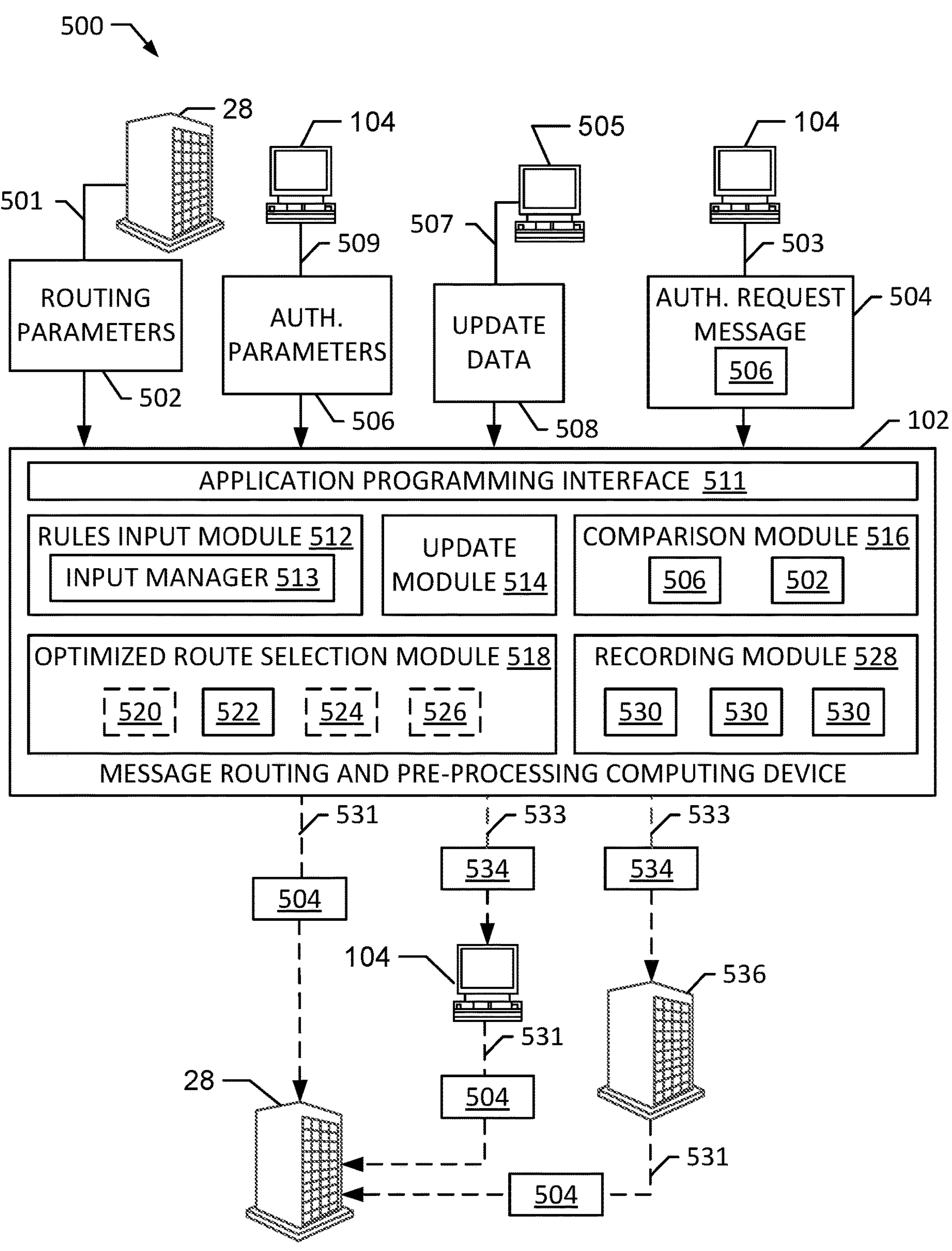

FIG. 5 illustrates a simplified data flow diagram 500 for optimized routing of network messages, such as transactions, by system 100 (shown in FIG. 2). In the illustrated embodiment, message routing and pre-processing (MRP) computing device 102 (shown in FIG. 1) receives a number of inputs. For example, MRP computing device 102 receives a routing parameter signal 501 including routing parameters 502 from one or more transaction processing networks (TPNs) 28. It should be understood that MRP computing device 102 is configured to receive routing parameters 502 from a plurality of TPNs 28, and that only one TPN 28 is illustrated merely for ease of understanding. As described herein, routing parameters 502 include the various processing parameters with which a particular TPN 28 functions. For example, routing parameters 502 may include an interchange rate, processing speed, processing or routing standards, security or liability parameters, and/or any other information as described herein. Routing parameters 502 may vary from TPN 28 to TPN 28, and, accordingly, MRP computing device 102 may store routing parameters 502 for each TPN 28 in a memory (e.g., database 110, shown in FIG. 1 and/or memory 410, shown in FIG. 4).

In some embodiments, MRP computing device 102 receives a transaction signal 503 including an authorization request message 504. Authorization request message 504 is associated with a transaction that has been initiated by a cardholder at a merchant computing device. MRP computing device 102 receives transaction signal 503 including authorization request message 504 from a user computing device 104 (also shown in FIG. 2), which may be a merchant computing device 104 and/or an acquirer computing device 104. Authorization request message 504 includes authorization parameters 506. As described herein, authorization parameters 506 includes the various processing preferences defined by a party associated with the corresponding transaction, such as an acquirer, merchant, and/or cardholder. For example, authorization parameters 506 may include a preference for speed of processing the transaction, cost of the transaction (e.g., a lowest interchange rate or merchant discount rate (MDR)), security of the transaction, liability for the transaction, card type preferences, regional and/or national preferences, and/or any other information as described herein. In certain embodiments, MRP computing device 102 receives authorization parameters 506 in a pre-processing signal 509 from a user computing device 104. In such embodiments, user computing device 104 may transmit authorization parameters 506 prior to the transmission of any authorization request message 504 and/or instead of transmitting authorization request message 504 to MRP computing device 102. For example, MRP computing device 102 may be associated with a message pre-processing service offered to various users (e.g., merchants and/or acquirers).

In certain embodiments, MRP computing device 102 is further in communication with an update server 505 configured to transmit an update signal 507 to MRP computing device 102. Update signal 507 includes update data 508, which identifies updates in various information received, stored, used, and/or received by MRP computing device 102. For example, update data 508 may include updates to interchange rates, routing parameters 502, authorization parameters 504, and/or any other information as described herein.

In one embodiment, MRP computing device 102 is configured to communicate with various other computing devices (e.g., TPNs 28, user computing devices 104, and/or update servers 505) via an Application Programming Interface (API) 511. In other embodiments, MRP computing device 102 communicates with other computing devices via any other communication method, including network messages (e.g., ISO 8583 messages).

In the illustrated embodiment, MRP computing device 102 includes a rules input module 512 configured to manage receipt of routing parameters 502 and authorization parameters 506. Rules input module 512 may be configured to facilitate display of a graphical user interface, for example, as part of a web browser or client application, at user computing device 104 and/or a computing device associated with TPN 28. The graphical user interface includes an input manager 513 that facilitates entry of routing parameters 502 and/or authorization parameters 506. For example, rules input module 512 may facilitate display of input manager 513 on an acquirer computing device 104 such that a user associated with that acquirer may enter authorization parameters 506, or preferences of that acquirer for the processing of network messages (e.g., those associated with transactions).

In some embodiments, MRP computing device 102 further includes an update module 514 configured to process update data 508 and update stored routing parameters 502, authorization parameters 506, and/or any other updated information. Moreover, MRP computing device 102 includes a comparison module 516. Comparison module 516 compares received authorization parameters 506 with stored and/or retrieved routing parameters 502 in order to determine the routing parameters 502 (associated with a particular TPN 28 of a plurality of TPNs 28) that best correlate with authorization parameters 506. The TPN 28 associated with those routing parameters 502 is referred to herein as the "optimized" authorization route. In some embodiments, this comparison and determination includes determining which routing parameters 502 contain the most matches with the received authorization parameters 506 and/or which routing parameters 502 best meet the conditions of authorization parameters 506. It should be understood that comparison module 516 may operate under programmed instructions to perform various comparisons and/or determinations for the purpose described herein and should not be limited by the examples recited above.

MRP computing device 102 also includes an optimized route selection module 518 configured to process a plurality of potential authorization processing routes 520, 522, 524, 526, each associated with a different TPN 28 (and corresponding routing parameters 502) based on the output from comparison module 516. Put another way, optimized route selection module 518 receives output from comparison module 516 of the routing parameters 502 associated with one TPN 28 that best meet the conditions of received authorization parameters 506. Optimized route selection module 518 then selects the authorization processing route (for example, route 522) associated with that particular TPN 28. That selected one of potential optimization routes 520, 522, 524, 526 is referred to herein as the "optimized authorization processing route," "optimized processing route," or "optimized transaction processing route." For the sake of example, in the illustrated embodiment, optimized route selection module 518 has selected route 522 as the optimized authorization processing route.

In some embodiments, MRP computing device 102 includes a recording module 528. Recording module 528 is configured to generate an optimized route record 530 associated with each authorization request message 504 (and/or other pre-processed message associated with received authorization parameters 506) including details of the routing performed by MRP computing device 102. For example, optimized route records 530 may include the particular TPN 28 and associated optimized route 520, 522, 524, or 526, etc. selected by the optimized route selection module 518, the day and/or time of selection and/or routing, whether MRP computing device 102 routed the authorization request message 504 or whether MRP computing device 102 transmitted routing instructions 534 (described further herein) for an alternate party to route the authorization request message 504, which party routed authorization request message 504, and/or any other information. Optimized route records 530 may be stored, retrieved, and/or transmitted in association with a clearing process associated with transactions corresponding to routed authorization request messages 504.

In embodiments in which MRP computing device 102 has received authorization request message 504, MRP computing device 102 may transmit a routing signal 531 including the authorization request message 504 to the TPN 28 associated with the optimized authorization processing route 522. In other words, MRP computing device 102 routes authorization request message 504 for optimized processing to TPN 28. In certain other embodiments, in which MRP computing device 102 performs a pre-processing service for a user computing device 104, MRP computing device 102 may be configured to transmit a transaction pre-processing signal 533 to the corresponding user computing device 104, the transaction pre-processing signal 533 including routing instructions 534. Routing instructions 534 identify optimized transaction processing route 522 and the corresponding TPN 28. In some embodiments, routing instructions 534 cause user computing device 104 to activate and transmit the authorization request message 504 associated with the authorization parameters 506 to the TPN 28 identified in routing instructions 534. User computing device 104 may then transmit routing signal 531 including the authorization request message 504 to the TPN 28 associated with the optimized authorization processing route 522. In still other embodiments, MRP computing device 102 may be associated with one particular TPN 28, referred to as a gateway TPN 536. In such embodiments, MRP computing device 102 performs optimized route selection as described above, but subsequently transmits transaction pre-processing signal 533 including routing instructions 534 to gateway TPN 536. Gateway TPN 536 may then transmit routing signal 531 including the authorization request message 504 to the TPN 28 associated with the optimized authorization processing route 522. In other words, MRP computing device 102 routes every pre-processed transaction message and/or authorization request message 504 through gateway TPN 536 for subsequent optimized routing.

FIG. 6 is a simplified diagram of an example method 600 for optimizing routing of transaction by system 100 (shown in FIG. 2). One or more steps of method 600 may be implemented using message routing and pre-processing (MRP) computing device 102 (shown in FIG. 1). Method 600 includes receiving 602 an authorization request message (e.g., authorization request message 504, shown in FIG. 5) associated with a transaction initiated by a cardholder with a merchant. The authorization request message includes authorization parameters (e.g., authorization parameters 506, also shown in FIG. 5) of the transaction. Method 600 also includes retrieving 604 a plurality of potential authorization routes (e.g., routes 520, 522, 524, 526, all shown in FIG. 5) for the authorization request message. Each potential authorization route includes routing parameters (e.g., routing parameters 502, also shown in FIG. 5), and each potential authorization route is associated with a respective transaction processing network (TPN) (e.g., TPN 28, shown in FIG. 1).

Method 600 further includes comparing 606 the authorization parameters to the routing parameters of each potential authorization route to determine an optimized authorization route for the authorization request message from the plurality of potential authorization routes. The optimized authorization route includes the routing parameters that most closely match the authorization parameters. In addition, the optimized authorization route associated with a first TPN of the plurality of TPNs. Method 600 also include routing 608 the authorization request message to the first TPN for authorization processing.

Figure 7:
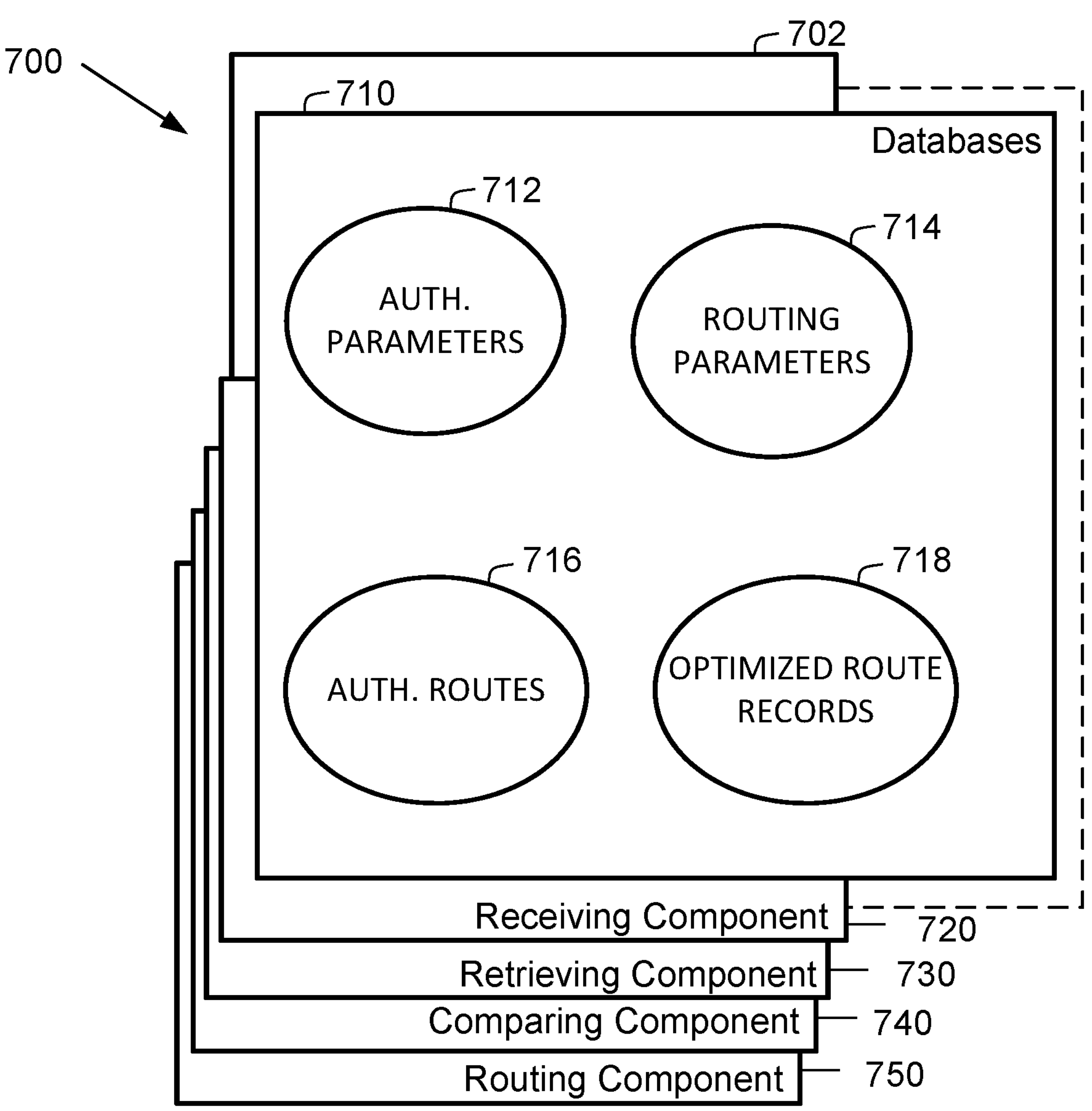

FIG. 7 is a diagram 700 of components of one or more example computing devices 702 that may be used in system 100 (shown in FIG. 2). Computing device 702 may include, for example, message routing and pre-processing (MRP) computing device 102 (shown in FIG. 1). A database 710 may store information such as, for example, authorization parameters 712 (which may include and/or be similar to authorization parameters 504, shown in FIG. 5), routing parameters 714 (which may include and/or be similar to routing parameters 502, shown in FIG. 5), authorization routes 716 (which may include and/or be similar to authorization routes 520, 522, 524, and/or 526, shown in FIG. 5), and/or optimized route records 718 (which may include and/or be similar to optimized route records 530, shown in FIG. 5). Database 710 is coupled to several separate components within computing device 702, which perform specific tasks.

In the illustrated embodiment, computing device 702 includes a receiving component 720. Receiving component 720 is configured to receive an authorization request message associated with a transaction initiated by a cardholder with a merchant. In one embodiment, the authorization request message includes authorization parameters 712 of the transaction. Computing device 702 also includes a retrieving component 730. Retrieving component 730 is configured to retrieve a plurality of potential authorization routes 716 for the authorization request message. Each potential authorization route 716 includes or is associated with routing parameters 714, and each potential authorization route 716 is associated with a respective transaction processing network (TPN).

Computing device 702 further includes a comparing component 740 configured to compare the authorization parameters 712 to the routing parameters 714. Comparing component 740 determines an optimized authorization route for the authorization request message from the plurality of potential authorization routes 716. The optimized authorization route includes the routing parameters 714 that most closely match the authorization parameters 712. The optimized authorization route is associated with a first TPN of the plurality of TPNs. Computing device 702 still further includes a routing component 750 configured to route the authorization request message to the first TPN for authorization processing.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the disclosure, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A message routing and pre-processing (MRP) computing device, said MRP computing device interposed in networked communication downstream of an initiating computing device and upstream of a plurality of transaction processing networks (TPNs), the initiating computing device not directly connected in networked communication with a subset of the plurality of TPNs, said MRP computing device comprising at least one processor in communication with a memory, said at least one processor configured to:

receive, from the initiating computing device, a first electronic message corresponding to an electronic transaction and including i) identifier data of an initiator of the first electronic message, the initiator associated with the initiating computing device, and ii) authorization parameter data indicating a priority designation of two or more authorization routing parameters from among a plurality of authorization routing parameters for routing the first electronic message to one of the plurality of TPNs, the plurality of authorization routing parameters including at least one of network processing speed and network security, the priority designation set by the initiator, the first electronic message being in a proprietary format used for sending electronic financial messages and being received at the MRP computing device via an Application Programming Interface (API) of the MRP computing device before being routed to any TPN of the plurality of TPNs;

in response to receiving the first electronic message, execute a pre-process operation on the received first electronic message prior to routing the first electronic message to one of the plurality of TPNs, the pre-process operation including (i) retrieving update data associated with the plurality of TPNs from an update server that stores the most current routing data for each TPN of the plurality of TPNs, (ii) processing the update data to extract the most current TPN routing parameters of the plurality of TPNs, and (iii) selecting, from the extracted most current TPN routing parameters, a plurality of candidate sets of TPN routing parameters, each candidate set of TPN routing parameters representing, respectively, the most current TPN routing parameters for any available TPN of the plurality of TPNs, the combination of the respective most current TPN routing parameters for each TPN of the plurality of TPNs indicating a respective message processing functionality of each respective TPN of the plurality of TPNs;

compare, via executing parameter comparison instructions stored in said memory, respective most current TPN routing parameters of each set of the retrieved plurality of candidate sets of TPN routing parameters to the two or more authorization routing parameters;

identify and select, based on an output associated with the executed parameter comparison instructions, one set of the plurality of candidate sets of TPN routing parameters that has two or more TPN routing parameters that correlate most closely with the two or more authorization routing parameters, the one set of the plurality of candidate sets of TPN routing parameters having a message processing functionality that is (i) based at least in part on the two or more TPN routing parameters and (ii) determined from the comparison to most closely correspond to the two or more authorization routing parameters associated with the priority designation identified in the first electronic message as compared to any other candidate set of TPN routing parameters of the plurality of TPN routing parameters for any other TPN of the plurality of TPNs;

select, as an optimized route for the first electronic message, a route associated with the one set of TPN routing parameters, the optimized route being associated with a first TPN of the plurality of TPNs, wherein the initiating computing device is not directly connected in networked communication with the first TPN;

generate routing instructions that include data corresponding to the optimized route and identifying the first TPN;

transmit the routing instructions to a router party such that the router executes the routing instructions to route the first electronic message along the optimized route to the first TPN on behalf of the initiating computing device to establish indirect networked communication between the initiating computing device and the first TPN and initiate further processing of the first electronic message by the first TPN according to the message processing functionality of the first TPN, thereby causing the first TPN to process the first electronic message according to the further processing in association with processing of the electronic transaction; and store optimized route data corresponding to the optimized route as an optimized route record for the electronic transaction in said memory and as part of a plurality of stored optimized route records stored in said memory, wherein the stored optimized route records are usable as part of a clearing process for transactions that have been routed via application of the pre-process operation to the transactions, such that each transaction is routed and cleared based on the most current data available in said memory and subsequent transactions avoid being routed to a stagnant TPN that has outdated TPN routing parameters.

2. The MRP computing device of claim 1, wherein the optimized route record includes an identifier of the first TPN, the one set of TPN routing parameters associated with the optimized route, and an identifier of the first electronic message routed to the first TPN.

3. The MRP computing device of claim 2, wherein said at least one processor is further configured to:

receive, from the initiating computing device, a second electronic message including additional data associated with the first electronic message;

retrieve, in response to the second electronic message, the optimized route record from said memory;

parse, from the optimized route record, the identifier of the first TPN; and cause, based on the identifier, the second electronic message to be routed to the first TPN.

4. The MRP computing device of claim 1, wherein said at least one processor is further configured to retrieve the plurality of candidate sets of TPN routing parameters for the first electronic message by accessing each of the plurality of TPNs via a respective API connection to identify the respective TPN routing parameters of the plurality of TPN routing parameters for each respective TPN.

5. The MRP computing device of claim 1, wherein the router is a gateway TPN of the plurality of TPNs, and wherein said at least one processor is further configured to route the first electronic message to the first TPN by transmitting, to the gateway TPN of the plurality of TPNs, the first electronic message along with the routing instructions.

6. A computer-implemented method for routing messages to a plurality of transaction processing networks (TPNs) using a message routing and pre-processing (MRP) computing device, wherein the MRP computing device is interposed in networked communication downstream of an initiating computing device and upstream of a plurality of TPNs, the initiating computing device not directly connected in networked communication with a subset of the plurality of TPNs, and the MRP computing device includes at least one processor in communication with a memory, said computer-implemented method comprising steps performed by the at least one processor of:

receiving, from the initiating computing device, a first electronic message corresponding to an electronic transaction and including i) identifier data of an initiator of the first electronic message, the initiator associated with the initiating computing device, and ii) authorization parameter data indicating a priority designation of two or more authorization routing parameters from among a plurality of authorization routing parameters for routing the first electronic message to one of the plurality of TPNs, the plurality of authorization routing parameters including at least one of network processing speed and network security, the priority designation set by the initiator, the first electronic message being in a proprietary format used for sending electronic financial messages and being received at the MRP computing device via an Application Programming Interface (API) of the MRP computing device before being routed to any TPN of the plurality of TPNs;

in response to receiving the first electronic message, execute a pre-process operation on the received first electronic message prior to routing the first electronic message to one of the plurality of TPNs, the pre-process operation including (i) retrieving update data associated with the plurality of TPNs from an update server that stores the most current routing data for each TPN of the plurality of TPNs, (ii) processing the update data to extract the most current TPN routing parameters of the plurality of TPNs, and (iii) selecting, from the extracted most current TPN routing parameters, a plurality of candidate sets of TPN routing parameters, each candidate set of TPN routing parameters representing, respectively, the most current TPN routing parameters for any available TPN of the plurality of TPNs, the combination of the respective most current TPN routing parameters for each TPN of the plurality of TPNs indicating a respective message processing functionality of each respective TPN of the plurality of TPNs;

comparing, via executing parameter comparison instructions stored in the memory, respective TPN routing parameters of each set of the retrieved plurality of sets of TPN routing parameters to the two or more authorization routing parameters;

identifying and selecting, based on an output associated with the executed parameter comparison instructions, one set of the plurality of candidate sets of TPN routing parameters that has two or more TPN routing parameters that correlate most closely with the two or more authorization routing parameters, the one set of the plurality of candidate sets of TPN routing parameters having a message processing functionality that is (i) based at least in part on the two or more TPN routing parameters and (ii) determined from the comparison to most closely correspond to the two or more authorization routing parameters associated with the priority designation identified in the first electronic message as compared to any other candidate set of TPN routing parameters of the plurality of TPN routing parameters for any other TPN of the plurality of TPNs;

selecting, as an optimized route for the first electronic message, a route associated with the one set of TPN routing parameters, the optimized route being associated with a first TPN of the plurality of TPNs, wherein the initiating computing device is not directly connected in networked communication with the first TPN;

generating routing instructions that include data corresponding to the optimized route and identifying the first TPN;

transmitting the routing instructions to a router such that the router executes the routing instructions to route the first electronic message along the optimized route to the first TPN on behalf of the initiating computing device to establish indirect networked communication between the initiating computing device and the first TPN and initiate further processing of the first electronic message by the first TPN according to the message processing functionality of the first TPN, thereby causing the first TPN to process the first electronic message according to the further processing in association with processing of the electronic transaction; and storing optimized route data corresponding to the optimized route as an optimized route record for the electronic transaction in the memory and as part of a plurality of stored optimized route records stored in the memory, wherein the stored optimized route records are usable as part of a clearing process for transactions that have been routed via application of the pre-process operation to the transactions, such that each transaction is routed and cleared based on the most current data available in the memory and subsequent transactions avoid being routed to a stagnant TPN that has outdated TPN routing parameters.

7. The computer-implemented method of claim 6, wherein the optimized route record includes an identifier of the first TPN, the one set of TPN routing parameters associated with the optimized route, and an identifier of the first electronic message routed to the first TPN.

8. The computer-implemented method of claim 7, further comprising steps performed by the at least one processor of:

receiving, from the initiating computing device, a second electronic message including additional data associated with the first electronic message;

retrieving, in response to the second electronic message, the optimized route record from the memory;

parsing, from the optimized route record, the identifier of the first TPN; and causing, based on the identifier, the second electronic message to be routed to the first TPN.

9. The computer-implemented method of claim 6, wherein said retrieving the plurality of candidate sets of TPN routing parameters for the first electronic message comprises accessing each of the plurality of TPNs via a respective API connection to identify the respective TPN routing parameters of the plurality of TPN routing parameters for each respective TPN.

10. The computer-implemented method of claim 6, wherein the router is a gateway TPN of the plurality of TPNs, and wherein routing the first electronic message to the first TPN comprises transmitting, to the gateway TPN of the plurality of TPNs, the first electronic message along with the routing instructions.

11. At least one non-transitory computer-readable storage medium having computer-executable instructions embodied thereon for routing messages to a plurality of transaction processing networks (TPNs), wherein when executed by a message routing and pre-processing (MRP) computing device that is interposed in network communication downstream of an initiating computing device and upstream of the plurality of TPNs, the initiating computing device not directly connected in network communication with a subset of the plurality of TPNs, the MRP computing device including at least one processor in communication with a memory, the computer-executable instructions cause the at least one processor to:

receive, from the initiating computing device, a first electronic message corresponding to an electronic transaction including i) identifier data of an initiator of the first electronic message, the initiator associated with the initiating computing device, and ii) authorization parameter data indicating a priority designation of two or more authorization routing parameters from among a plurality of authorization routing parameters for routing the first electronic message to one of the plurality of TPNs, the plurality of authorization routing parameters including at least one of network processing speed and network security, the priority designation set by the initiator, the first electronic message being in a proprietary format used for sending electronic financial messages and being received at the MRP computing device via an Application Programming Interface (API) of the MRP computing device before being routed to any TPN of the plurality of TPNs;

in response to receiving the first electronic message, execute a pre-process operation on the received first electronic message prior to routing the first electronic message to one of the plurality of TPNs, the pre-process operation including (i) retrieving update data associated with the plurality of TPNs from an update server that stores the most current routing data for each TPN of the plurality of TPNs, (ii) processing the update data to extract the most current TPN routing parameters of the plurality of TPNs, and (iii) selecting, from the extracted most current TPN routing parameters, a plurality of candidate sets of TPN routing parameters, each candidate set of TPN routing parameters representing, respectively, the most current TPN routing parameters for any available TPN of the plurality of TPNs, the combination of the respective most current TPN routing parameters for each TPN of the plurality of TPNs indicating a respective message processing functionality of each respective TPN of the plurality of TPNs;

compare, via executing parameter comparison instructions stored in the memory, respective most current TPN routing parameters of each set of the retrieved plurality of candidate sets of TPN routing parameters to the two or more authorization routing parameters;

identify and select, based on an output associated with the executed parameter comparison instructions, one set of the plurality of candidate sets of TPN routing parameters that has two or more TPN routing parameters that correlate most closely with the two or more authorization routing parameters, the one set of the plurality of candidate sets of TPN routing parameters having a message processing functionality that is (i) based at least in part on the two or more TPN routing parameters and (ii) determined from the comparison to most closely correspond to the two or more authorization routing parameters associated with the priority designation identified in the first electronic message as compared to any other candidate set of TPN routing parameters of the plurality of TPN routing parameters for any other TPN of the plurality of TPNs;

select, as an optimized route for the first electronic message, a route associated with the one set of routing parameters, the optimized route being associated with a first TPN of the plurality of TPNs, wherein the initiating computing device is not directly connected in networked communication with the first TPN;

generate routing instructions that include data corresponding to the optimized route and identifying the first TPN;

transmit the routing instruction to a router such that the router executes the routing instructions to route the first electronic message along the optimized route to the first TPN on behalf of the initiating computing device to establish indirect networked communication between the initiating computing device and the first TPN and initiate further processing of the first electronic message by the first TPN according to the message processing functionality of the first TPN, thereby causing the first TPN to process the first electronic message according to the further processing in association with processing of the electronic transaction; and store optimized route data corresponding to the optimized route as an optimized route record for the electronic transaction in the memory and as part of a plurality of stored optimized route records stored in the memory, wherein the stored optimized route records are usable as part of a clearing process for transactions that have been routed via application of the pre-process operation to the transactions, such that each transaction is routed and cleared based on the most current data available in the memory and subsequent transactions avoid being routed to a stagnant TPN that has outdated TPN routing parameters.

12. The at least one non-transitory computer-readable storage medium of claim 11, wherein the optimized route record includes an identifier of the first TPN, the one set of routing parameters associated with the optimized route, and an identifier of the first electronic message routed to the first TPN.

13. The at least one non-transitory computer-readable storage medium of claim 12, wherein the computer-executable instructions further cause the at least one processor to:

receive, from the initiating computing device, a second electronic message including additional data associated with the first electronic message;

retrieve, in response to the second electronic message, the optimized route record from the memory;

parse, from the optimized route record, the identifier of the first TPN; and cause, based on the identifier, the second electronic message to be routed to the first TPN.

14. The at least one non-transitory computer-readable storage medium of claim 11, wherein the computer-executable instructions further cause the at least one processor to retrieve the plurality of candidate sets of TPN routing parameters for the first electronic message by accessing each of the plurality of TPNs via a respective API connection to identify the respective TPN routing parameters of the plurality of TPN routing parameters for each respective TPN.

15. The at least one non-transitory computer-readable storage medium of claim 11, wherein the router is a gateway TPN of the plurality of TPNs, and wherein the computer-executable instructions further cause the at least one processor to route the first electronic message to the first TPN by transmitting, to the gateway TPN of the plurality of TPNs, the first electronic message along with the routing instructions.

16. The MRP computing device of claim 1, wherein the respective most current TPN routing parameters are included within update data associated with the plurality of candidate sets of TPN routing parameters, and said at least one processor is further configured to:

receive the update data such that the comparison between the respective most current TPN routing parameters of each set of the retrieved plurality of candidate sets of TPN routing parameters to the two or more authorization routing parameters is based on the update data.

17. The MRP computing device of claim 16, wherein said at least one processor is further configured to:

process the update data; and update prior stored route data with the update data, thereby replacing the prior stored route data with the most current TPN routing parameters included within the update data.

* * * * *